July 18, 1950 L. F. JONES 2,515,514
CABINET FOR PREPARATION AND SERVING OF HOT BEVERAGES
Filed May 19, 1947
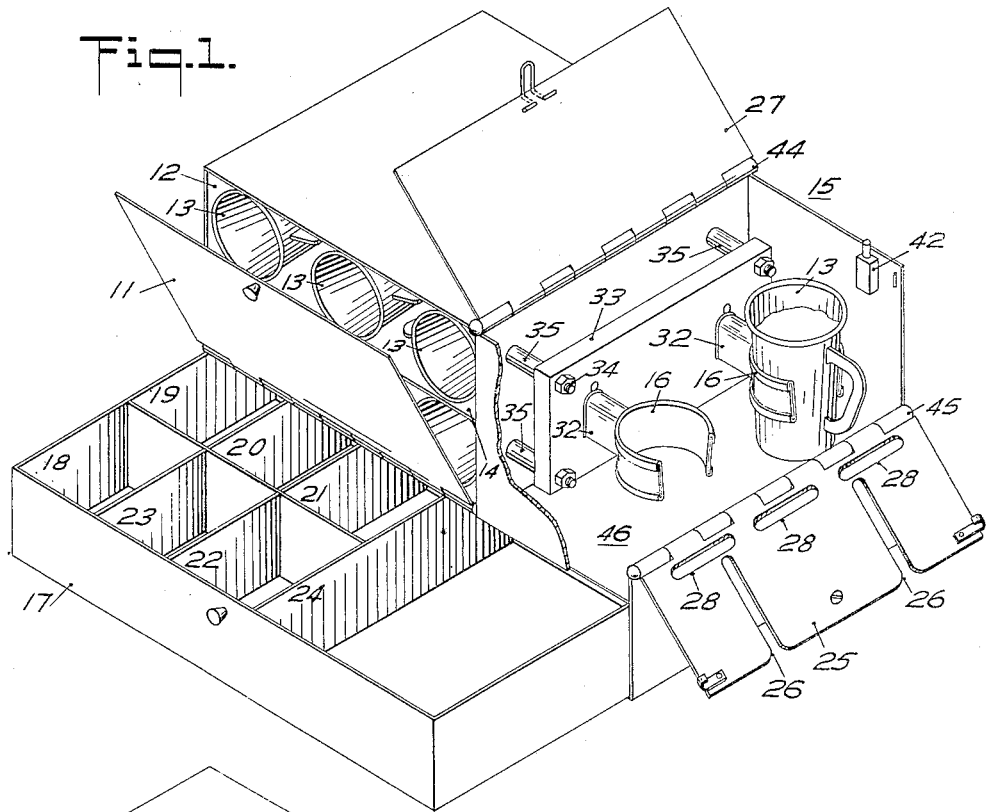
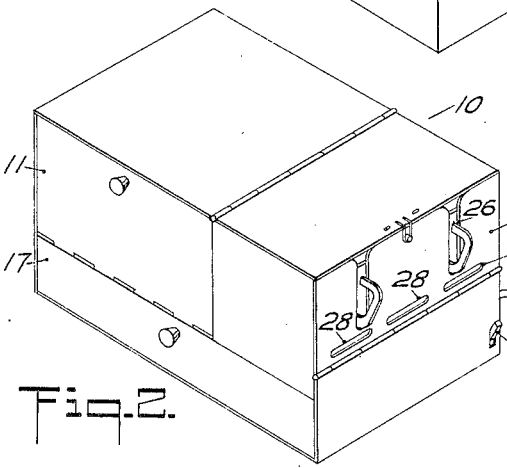
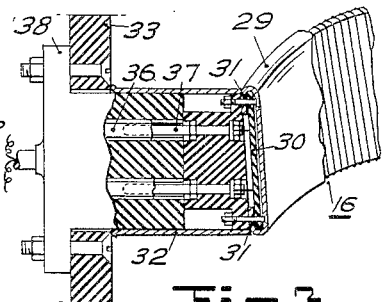
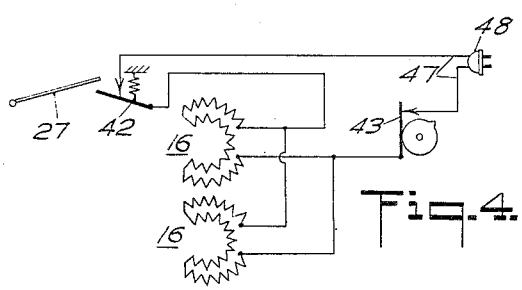
INVENTOR
LOREN F. JONES
BY
Woodcock and Phelan
ATTORNEYS Patented July 18, 1950

2,515,514

UNITED STATES PATENT OFFICE 2,515,514

CABINET FOR PREPARATION AND SERVING OF HOT BEVERAGES

Loren F. Jones, Philadelphia, Pa.

Application May 19, 1947, Serial No. 749,105

5 Claims. (Cl. 219—19)

This invention relates to a small portable cabinet or servery for the preparation and serving of hot beverages such as coffee, tea, cocoa or the like.

The general object of my invention is to provide a simple, compact, safe and sanitary arrangement for the preparation and serving of hot beverages preferably in inexpensive disposable cups and using disposable utensils in avoidance of washing inconveniences. A particular object of the invention is to provide a heater which, without physical contact therewith, heats a beverage contained within a disposable cup. A further object of the invention is to provide a compact cabinet having storage space for all materials, except water, and utensils required to prepare and serve beverages for an extended period; the cabinet having constructional features facilitating cleaning and affording protection from spillage, from fire hazards and from injury to the server resulting from contact with the heater.

In accordance with the invention, one compartment of the cabinet is provided with at least one electrical heating device shaped snugly to engage and preferably also to support a cup for heating of its contents.

More particularly, each of the one or more heaters is generally of conical ring shape with a gap for the clearance of a cup handle and the heater is so positioned that its gap is opposite a slot in an exterior wall of the compartment through which the handle of the cup extends for removal of the cup without danger of contact by the server's hand with the heater.

Further in accordance with the invention, one wall of the heating compartment, preferably the aforesaid slotted wall, is hinged to swing outwardly, exposing a well provided to retain any spillage and which is then accessible for cleaning.

Further in accordance with the invention, a supply of the cups, which are preferably of paper or the like, is stored in another compartment of the cabinet and the ingredients and utensils necessary for preparation of the desired beverage are stored in still another compartment or compartmented drawer of the cabinet. These compartments, and particularly the latter one, are so located that the possibility of liquid spilling into them during the preparation, heating or serving of the beverage is minimized.

The invention further resides in features of construction, combination and arrangement hereinafter described and claimed.

For a more detailed understanding of the invention and for illustration of a preferred embodiment thereof, reference is to be had to the accompanying drawings in which:

Fig. 1 is a perspective view of the cabinet with its compartments open and with part of its wall structure broken away to show features of its internal construction;

Fig. 2 is a perspective view of the cabinet with the compartments closed;

Fig. 3 is a partial sectional view of one of the heaters shown in Fig. 1; and

Fig. 4 is a schematic wiring diagram of the heater and switch circuits for the cabinet.

Though not limited thereto, the cabinet arrangement herein described as exemplary of the invention is particularly suited for use in an office where it may be desired to prepare and serve a light collation including a hot beverage such as coffee, tea, cocoa and the like with a minimum of inconvenience, space and equipment. With its compartments closed, as shown in Fig. 2, the cabinet 10 may be of simple rectangular form which facilitates its storage in a closet or file drawer if desired. A cabinet of size sufficient to hold all materials and utensils necessary for use over a substantial period of time, for example, a month, may be of very moderate dimensions. The door 11, when opened, affords access to a compartment 12 in which may be stored a supply of cups 13, which may be of the familiar paper type or of thin plastic type which can be telescoped for storage and which can be thrown away after use. In the construction shown, the compartment 12 is provided with a horizontal partition 14 dividing it into upper and lower compartments, each suited to receive several rows of paper cups. The storage compartment 12 extends substantially less than the full length of the cabinet, leaving at the right end thereof a heating compartment 15 in which are disposed a pair of electrical heating units 16 which are shaped to fit the cups 13 and hold them suspended for heating of their liquid contents.

When the lower drawer or compartment 17 extending the full length of the cabinet 10 is opened, access is afforded to the coffee, tea or cocoa, sugar, powdered milk, spoons, napkins or other materials or utensils usable in preparation of hot beverages. For example, compartments 18, 19, 20, 21 and 22 may contain respectively coffee, tea, cocoa, sugar, powdered milk; the compartment 23 may be used for storage of disposable spoons, and the larger compartment 24 extending the full depth of the drawer may be used for storage of paper napkins, papers saucers and cookies, cakes or other edible tidbits.

In use of the cabinet, a pair of cups are removed from compartment 12, partially filled with water or other suitable liquid and slipped into the electrical heaters 16. The heaters are then energized for transfer of heat to the liquid in the cups. After the water in the cups has been heated to the desired temperature, usually the boiling point, the coffee, tea or the like is added, and the heating continued for the required time. The cups may then be removed, and after their contents are consumed, may be destroyed. A cabinet of the size above mentioned, though small and inconspicuous, is sufficient to store, with the exception of water, all the ingredients and materials necessary for about a month's use; and in addition includes all the equipment necessary for heating the beverage.

As shown in Fig. 1, each of the heating devices 16 is in the form of a split ring having a gap which clears the cup handle and so permits the cup to be removed by grasping its handle without danger of contact between the server's hand and the heater. Further to protect the server's hand, the wall 25 of the heater compartment is provided with slits 26, each in alignment with the gap of one of the heaters 16 to allow the handle of the cup therein to project exteriorly of the cabinet, as shown in Fig. 2. Except for cleaning purposes, the wall 25 is in its vertical position and the cup may be inserted into the heating yoke or ring 16 and removed therefrom through the open top of the compartment 15, the handle 24 at all times remaining exteriorly of the compartment so that there is no danger of the server's hand being burned. Furthermore, at least the inner face of the wall 25, and preferably the other walls as well, may be covered with sheet heat-insulating material, such as asbestos or the like.

Preferably the handles of the cups 13 are fireproofed, as by suitable chemical treatment, so that in event a cup should burn, its handle, which is the only part that could fall outside of the cabinet, would not ignite and so constitute a fire hazard.

Preferably during boiling of water in the cups 13, the top door 27 of the heater compartment is thrown open generally as shown in Fig. 1, so that air may enter the ventilation slot 28 in the lower port of the wall 25 of the heater compartment, and after passing through the compartment leave it through the open upper end. This avoids overheating of the cabinet without undue cooling of the liquid in the cups which are in intimate thermal transfer relation with the encircling heating units. If desired, ventilation openings may also be provided in the top door 27.

Each of the heating units 16, as shown in Figs. 1 and 3, may comprise a flat strip 29 of suitable heat-conducting material such as metal or plastic which is shaped, as by bending or in casting, into the form of a ring whose internal diameter preferably progressively increases from the bottom to top in conformity with the taper of the sides of the cups 13, thus snugly to fit the cup and insure intimate engagement between the cup and the heater throughout a substantial area. In the particular form shown, the upper and lower edges of a metal strip 29 are turned outwardly toward each other, Fig. 3, to form a channel in which is received a strip-like electrical heater element 30 retained in position by the outturned edges or lips of strip 29. The heater element may, for example, comprise resistance wire wound over a thin sheet of mica or other suitable heat-resistant insulating material and held from electrical contact with the metal strip 29 by a facing mica strip or equivalent insulation.

Preferably the inner face of the heater 16 is effectively darkened as by sand-blasting to enhance the transfer of heat to the cup and the outer face is brightened as by polishing to reduce radiation losses. Convection losses may be decreased by covering the rear or outer face of heater element 30 with any suitable heat-insulating material.

The transfer of heat from the heater element to the liquid in the cup may be principally by conduction or principally by radiation, depending upon factors such as the construction of the heater and the cup material. With the particular type of heater shown and as used with paper cups, for example, the transfer of heat to the liquid is principally by conduction, first to the cup and thence by conduction through the walls of the cup. If the inner face of the heater is concave, instead of flat as shown, transfer of heat to the cup walls may be largely by radiation. In either case, if the cup is of material which is a poor conductor of heat but effectively transmits radiant heat, the heating of liquid in the cup may be largely by radiation from the heater.

Each of the heating devices 16 is suitably supported out from contact with all walls of the heating compartment as by a support or plug 32 suitably fastened to the heater 16 and permanently or disengageably connected to a connection panel 33 suitably mounted, as by bolts 34 and standoff sleeves 35, within the heating compartment. Panel 33 may be of asbestos board or the like to minimize heating of adjacent compartments. In the particular arrangement shown in Fig. 3, the supporting structure 32 of each heater 16 includes a connection plug such as commonly used for electrical appliances and comprises contact plugs 37 received by socket terminals 36 extending from the connection plate 38 suitably fastened to the rear face of the panel 33. With this construction, a heating device 16 may be removed for replacement or repair, or to prevent its energization when less than all of the heaters are to be used for preparation of the hot beverages.

If desired, an interlock switch 42 may be provided to prevent energization of the heaters 16 except when the cover 27 of the heater compartment 15 is in a desired position. Specifically the switch 42 may be of such construction that when the cover 27 is closed, the heater circuit is broken, regardless of the position of the main switch 43. Thus with cover 27 open, the cool air entering the heating compartment through the ventilation slots in side wall 25 and leaving the compartment through the open top minimizes the possibility of ignition of the cup should the liquid therein boil away. On the other hand, if it is desired to have the cover 27 closed during boiling of liquid in the cups 13, the interlock switch 42 may be of the type which is biased to open position and is closed only when the cover 27 is locked in the closed position shown in Fig. 2. In such case, if the cup should ignite there is no possibility of any of its burning fragments being carried out of the heating compartment by air currents.

In either case, the hinge 44 of the cover 27 is preferably located at the rear upper edge of the heater compartment, as viewed in Fig. 1, so that when the covers 25 and 27 are open, the heater compartment is completely accessible for cleaning. The side cover 25 is hinged at 45 to allow the cover to be opened, exposing a well 46 provided for retention of any liquid which is spilled from the cups as during their insertion or removal from the heater 16 or because of violent boiling of the liquid. This protects the surface of any piece of furniture on which the cabinet may be disposed. With the cover in the open position shown in Fig. 2, such spillage may be readily sponged up by a paper napkin or the like. Furthermore in the construction shown, the drawer 17 opens from the front of the cabinet whereas the heating compartment opens from the sides so that should any liquid be spilled in the insertion or removal of cups, or in cleaning out of the heating compartment, it cannot fall into any of the compartments 18 to 23 to contaminate or soil any of their contents.

The main switch 43 of the heater circuit, Fig. 4, may be a manually operable on-off switch or it may be a time switch to insure deenergization of the heater after a predetermined interval should the server fail to remove the cups before their liquid contents have boiled away. Of course, so long as the liquid level in the cups is above that of the heaters 16, the temperature of the cup walls, even though of paper, will be maintained below the charring or ignition point. The ring-type heaters engage only the sides of the cups so that there is no danger of charring or burning even if the cups are of the re-entrant bottom type having a bottom flange unprotected by contact with the liquid contents. The conduction type heater shown is preferred over the immersion type because there is no contamination of the beverage.

As shown in Figs. 2 and 4, the cabinet is provided with an external cord 47 and plug 48 for connection of the heater units to any convenient electrical outlet. All other wiring is within the cabinet itself.

The partitions and walls of the cabinet may be of thin sheet metal or plastic.

It shall be understood the invention is not limited to the specific construction illustrated, but that changes and modifications may be made within the scope of the appended claims.

What is claimed is:

1. An arrangement suited for heating liquid in a non-metallic drinking cup having a reentrant bottom and a handle extending from and along its side, a conical ring member for encircling the cup and having a gap to clear the cup handle, an electrical heating element in said ring member for transfer of heat to liquid in the cup, and housing wall structure having a slot therein aligned with said gap of the ring member for extension through said housing wall structure of the cup handle.

2. An arrangement as in claim 1 in which the slotted wall structure is hinged for swinging movement away from said ring member.

3. An arrangement as in claim 2 in which the conical ring member is mounted from wall structure opposite the hinged slotted wall structure in spaced relation to both of said wall structures.

4. An arrangement as in claim 1 in which the slotted wall structure is hinged for swinging movement downwardly and away from said ring member and in which top wall structure is hinged for swinging movement upwardly and away from said ring member.

5. An arrangement as in claim 1 in which the slotted wall structure has an air vent near the lower edge and in which top wall structure is hinged for swinging movement upwardly and away from said ring member.

LOREN F. JONES.

REFERENCES CITED

The following references are of record in the file of this patent:

UNITED STATES PATENTS

| Number | Name | Date |
| --- | --- | --- |
| 1,345,696 | Richardson | July 6, 1920 |
| 1,414,494 | Arntfield | May 2, 1922 |
| 1,567,679 | Rittman et al. | Dec. 29, 1925 |
| 1,805,716 | Clawson | May 19, 1931 |
| 2,022,662 | Geyser | Dec. 3, 1935 |
| 2,029,075 | Knight | Jan. 28, 1936 |
| 2,293,764 | Roeder | Aug. 25, 1942 |
| 2,405,103 | Winn | July 30, 1946 |
| 2,405,984 | Sharpe | Aug. 20, 1946 |

FOREIGN PATENTS

| Number | Country | Date |
| --- | --- | --- |
| 95,210 | Switzerland | June 16, 1922 |
| 207,584 | Switzerland | Feb. 16, 1940 |
| 440,813 | Great Britain | Jan. 7, 1934 |